United States Patent
Brown et al.

(10) Patent No.: US 7,827,394 B2
(45) Date of Patent: Nov. 2, 2010

(54) METHODS AND SYSTEMS FOR CONFIGURING COMPUTERS

(75) Inventors: Norman P. Brown, Tomball, TX (US);
Joseph W. Hoch, Houston, TX (US);
Sam J. Lee, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 744 days.

(21) Appl. No.: 11/610,959

(22) Filed: Dec. 14, 2006

(65) Prior Publication Data

US 2008/0148031 A1   Jun. 19, 2008

(51) Int. Cl.
*G06F 9/24* (2006.01)

(52) U.S. Cl. .................. 713/1; 713/2; 717/175; 719/320

(58) Field of Classification Search .......... 713/1, 713/2; 717/100, 175, 177; 719/320
See application file for complete search history.

(56) References Cited

U.S. PATENT DOCUMENTS

| | | | |
|---|---|---|---|
| 6,080,207 A * | 6/2000 | Kroening et al. | 717/172 |
| 6,718,464 B2 | 4/2004 | Cromer | |
| 6,928,541 B2 | 8/2005 | Sekiguchi | |
| 6,931,646 B2 * | 8/2005 | Dubal | 719/327 |
| 6,944,758 B2 | 9/2005 | Lin | |
| 7,356,679 B1 * | 4/2008 | Le et al. | 713/1 |
| 7,426,052 B2 * | 9/2008 | Cox et al. | 358/1.15 |
| 7,506,335 B1 * | 3/2009 | Wooff et al. | 717/173 |
| 2004/0221147 A1 * | 11/2004 | Tseng et al. | 713/1 |
| 2005/0216912 A1 | 9/2005 | Cox | |
| 2006/0047946 A1 * | 3/2006 | Keith, Jr. | 713/2 |

FOREIGN PATENT DOCUMENTS

WO   WO2005081122   9/2005

\* cited by examiner

*Primary Examiner*—Thuan N Du

(57) ABSTRACT

A system is provided, the system includes a base computer having operating system (OS) settings and Basic Input/Output System (BIOS) settings. The system also includes a plurality of managed computers. An OS image file having the OS settings and the BIOS settings is transferred from the base computer to the managed computers for configuring the managed computers.

15 Claims, 5 Drawing Sheets

METHODS AND SYSTEMS FOR CONFIGURING COMPUTERS

BACKGROUND

Some electronic devices have various settings and programs that can be configured prior to sending the device to an end user. For example, some X86 PC compatible platforms may be configured with particular software, operating system (OS) settings or Basic Input/Output System (BIOS) settings prior to sending the platform to an end user. Configuring the OS settings and the BIOS settings for one of these platforms involves separate tools which undesirably increase the complexity and expense of the configuration process.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

Embodiments enable settings of a device to be stored and distributed in a single file. For example, operating system (OS) settings and Basic Input/Output System (BIOS) settings of an X86 PC compatible device can be stored and distributed as a single OS image file. The OS image file can be deployed on other devices to enable configuration based on the OS settings and BIOS settings provided with the OS image file.

Figure 1:
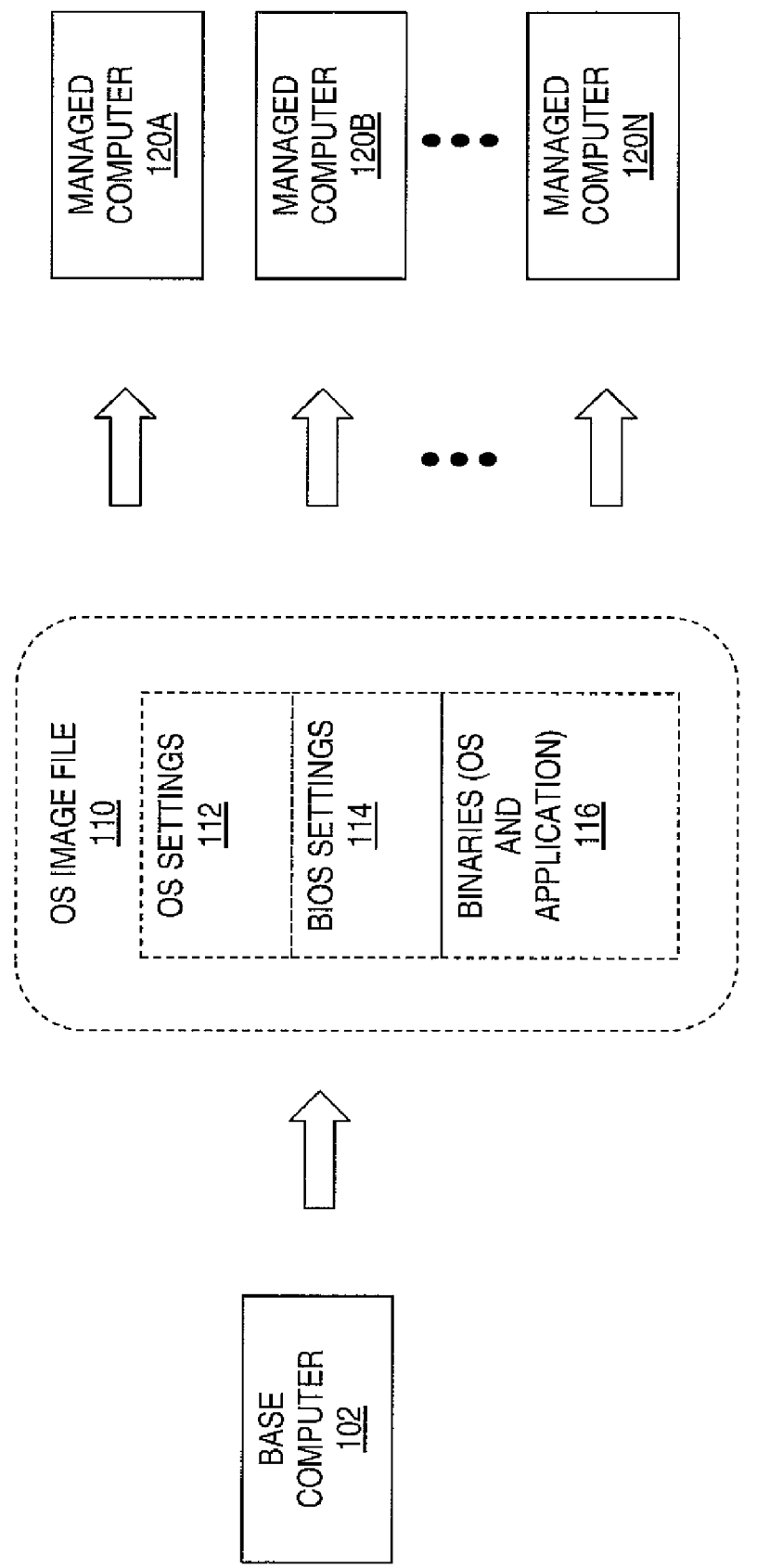
FIG. 1 illustrates distribution of an operating system (OS) image file in accordance with embodiments.

FIG. 1 illustrates distribution of an operating system (OS) image file 110 in accordance with embodiments. As shown in FIG. 1, the OS image file 110 comprises OS settings 112, BIOS settings 114, and binaries 116 (e.g., OS and application binaries). The OS settings 112 correspond to all OS settings of a base computer 102 or at least the OS settings that have been changed from a default state. The BIOS settings 114 correspond to all BIOS settings of the base computer 102 or at least the BIOS settings that have been changed from a default state. The binaries 116 correspond to executable files or related files such as libraries.

In at least some embodiments, the OS settings 112, the BIOS settings 114, and the binaries 116 are configured by an administrator (e.g., an information manager, a distributor or a reseller) of the base computer 102. For example, the administrator may selectively configure the OS settings 112, the BIOS settings 114 and/or the binaries 116 of the base computer 102 from a default state. The administrator also may load applications onto the base computer 102, which could affect the binaries 116 represented in the OS image file 110.

As shown in FIG. 1, the OS image file 110 is provided to a plurality of managed computers 120A-120N. In some embodiments, the OS image file 110 is distributed to the managed computers 120A-120N via a remote or local connection with the base computer 102. Alternatively, the OS image file can be distributed to the managed computers 120A-120N using a removable storage medium (e.g., a Flash drive or an optical disk). The OS image file 110 enables the managed computers 120A-120N to deploy the configuration (e.g., the OS settings 112, the BIOS settings 114 and/or the binaries 116) of the base computer 102 which provided the OS image file 110. Using the same or similar distribution process, an administrator is able to distribute multiple OS image files to different computers. For example, a particular OS image file can be prepared for each of various computer models.

Figure 2:
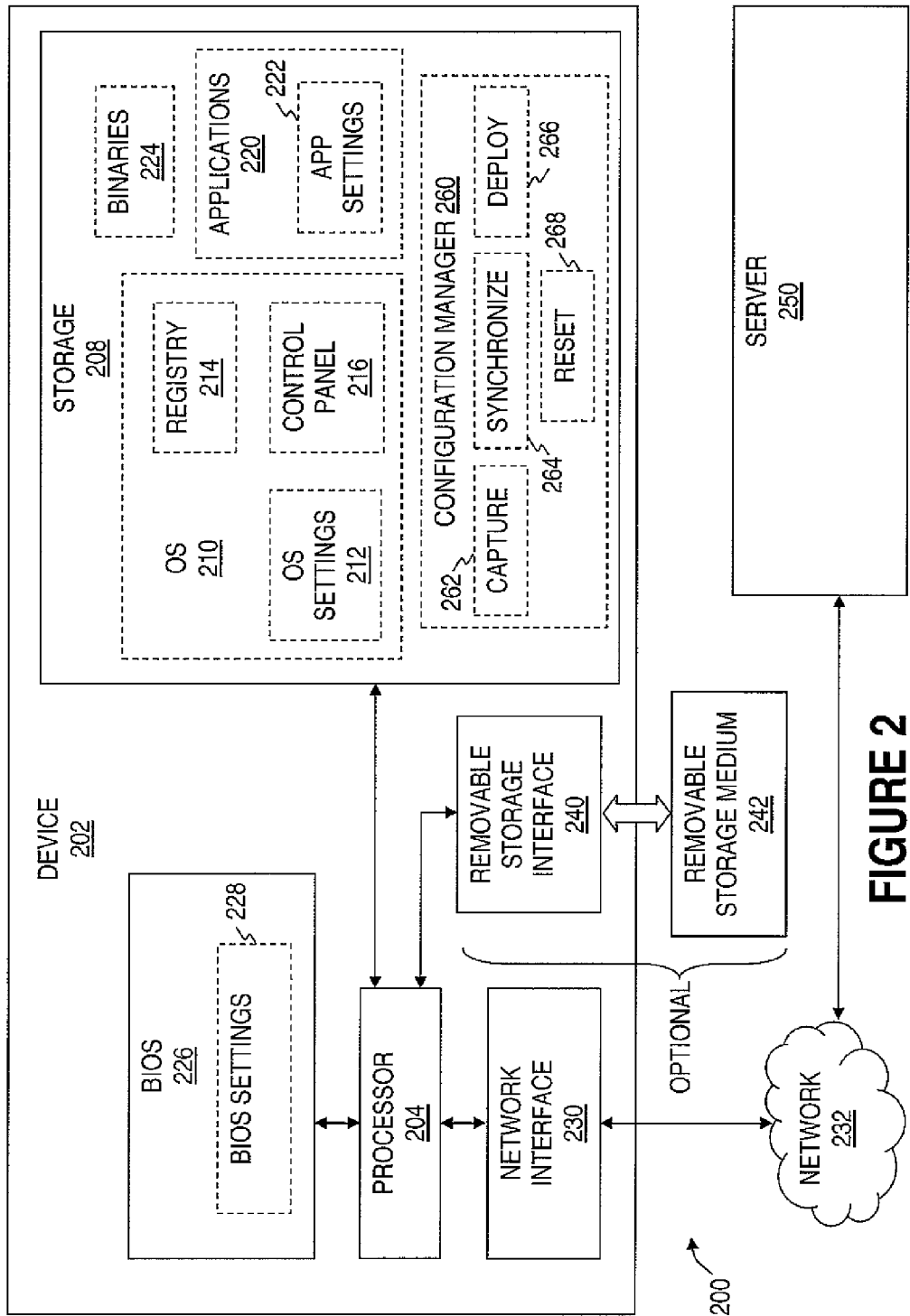
FIG. 2 illustrates a system in accordance with embodiments.

FIG. 2 illustrates a system 200 in accordance with embodiments. As shown in FIG. 2, a system 200 comprises a device 202 coupled to a server 250 via a network 232. As an example, the device 202 could be the base computer 102 of FIG. 1 and the server 250 could be a File Transfer Protocol (FTP) server. In at least some embodiments, the device 202 is a computer sometimes referred to in industry as a "thin client" although other embodiments are possible.

As shown, the device 202 comprises a processor 204 coupled to a storage 208. The storage 208 comprises a computer-readable medium such as volatile storage (e.g., random access memory), non-volatile storage (e.g., hard disk drive) or a combination thereof. The storage 208 stores applications 220 having application settings 222. The storage 208 also stores an operating system (OS) 210 having OS settings 212, a registry 214 and a control panel 216. The OS settings 212 influence various functions of the OS 210 and correspond, at least, to settings which a user of the device 202 is able to configure via the control panel 216.

The control panel 216 enables a user to view and update the OS settings 212. In at least some embodiments, the control panel 216 also enables a user to update BIOS settings 228 of a BIOS 226 in communication with the processor 204. The BIOS settings 228 may be stored, for example, in a battery-backed up Complimentary Metal-Oxide Semiconductor (CMOS) storage and/or a Flash memory associated with the BIOS 226. Even though the BIOS settings 228 are stored in the BIOS 226, some or all of these settings are viewable and updatable from the control panel 216 and may even appear as OS settings. The control panel 216 also may categorize certain OS settings 212 and BIOS settings 228 together for viewing and updating by a user. For example, a BIOS setting 228 which enables/disables a Universal Serial Bus (USB) controller can be categorized with other port lock features (e.g., OS-based port lock features) by the control panel 216 and may be listed generally as a port lock feature rather than a BIOS setting 228.

In at least some embodiments, a copy of the BIOS settings 228 are stored in the registry 214 for use by the OS 210. As will later be described, synchronization between the BIOS settings 228 in the BIOS 226 and corresponding settings in the registry 214 may take place as changes occur. Alternatively, the synchronization takes place during a subsequent shut-down process or boot process after the changes occur.

In addition to storing a copy of the BIOS settings 228, the registry 214 may store a copy of the application settings 222, the OS settings 212 or other information relevant to the configuration and operation of the device 202. Upon request, information from the registry 214 and/or other locations are captured in a file such an OS image file. In at least some embodiments, the OS settings 212, the BIOS settings 228 and binaries 224 are captured in the OS image file. The binaries 224 stored in the storage 208 and correspond to executable files related to the OS 210 and the applications 220. In some cases, the entire flash Integrated Device Electronics (IDE) drive of the device 202 is captured as the OS image file. This flash IDE drive corresponds to some of the storage 208 in FIG. 2.

The capture process is performed by executing a configuration manager 260 having various tools for managing the configuration of the device 202 as well as the configuration of other devices. Although the configuration manager 260 in FIG. 2 is shown as being stored in the storage 208, some or all of the tools of the configuration manager 260 could alternatively be stored in other locations such as storage associated with the BIOS 226, the server 250, a removable storage medium 242 (e.g., a Flash drive or optical disk) or a combination thereof.

In at least some embodiments, the configuration manager 260 comprises a capture tool 262 that selectively captures configuration information of the device 202 into a file. For example, the OS settings 212, the BIOS settings 228, the binaries 224 or copies of these settings and binaries may be captured in an OS image file (e.g., the OS image file 110 of FIG. 1) upon request from an administrator.

The OS image file or a copy of the OS image file can then be transferred to other devices for deployment of the device configuration represented by the OS image file. For example, the OS image file of the device 202 can be transferred to a server 250 or to a removable storage medium 242 for later distribution to other devices. In at least some embodiments, the processor 204 couples to a network interface 230, which enables the device 202 to communicate with the server 250 or other devices via the network 232. The network interface 230 may take the form of modems, modem banks, Ethernet cards, Universal Serial Bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, or other network interfaces. In at least some embodiments, the OS image file of the device 202 is transferable via the network interface 230 and the network 232 to the server 250 for distribution to other devices. The distribution process can be automated through the server 250 or controlled by an administrator through the server 250.

Optionally, the processor 204 couples to a removable storage interface 240, which enables the device 202 to read data from or write data to a removable storage medium 242. The removable storage medium 242 could be, for example, a USB Flash drive, an optical disk, or some other removable storage medium now known or later developed. In at least some embodiments, the OS image file of the device 202 is transferable via the removable storage interface 240 to the removable storage medium 242 for distribution to other devices. As an example, the removable storage medium 242 can be used to boot other devices. During the boot process, the OS image file is provided from the removable storage medium 242 to the device being booted in order to update the device's configuration.

As needed, the synchronize tool 264 of the configuration manager 250 is executed to synchronize changes to the various settings of the device 202. For example, if settings related to the BIOS 226 are changed via the control panel 216, the registry 214 may record the changes before the BIOS 226. The BIOS settings 228 of the BIOS 226 can later be synchronized with the recorded changes in the registry 214. In various embodiments, the synchronization could occur during runtime (when the change occurs), during a subsequent shut-down process or during a subsequent boot process.

In at least some embodiments, the BIOS 226 can be accessed outside the control panel 216 (e.g., from DOS or an F10 setup). If this occurs, the BIOS 226 records changes to the BIOS settings before the registry 214. In such case, the settings in the registry 214 can later be synchronized with the recorded changes in the BIOS 226. In various embodiments, the synchronization could occur during run-time (when the change occurs), during a subsequent shut-down process or during a subsequent boot process.

The deploy tool 266 causes information from the OS image file to be written to a device such that the device is configured according to the settings and binaries provided by the OS image file. In at least some embodiments, deploying the OS image file causes BIOS settings to be written to an OS registry of a device being configured. Later, the BIOS CMOS of the device being configured can be updated to incorporate the BIOS settings previously written to the registry. Similarly, OS settings and binaries can be written into the registry or other locations for later incorporation by the device being configured. In at least some embodiments, deployment of settings and binaries from the OS image file occurs during a boot process of the device being configured.

The reset tool 268 causes the OS settings 212 and the BIOS settings 228 to be reset to a default state. For example, if a combination of BIOS and OS settings causes the device 202 to become unusable, a global reset key (e.g., F9) can be pressed to cause both OS and BIOS settings to be reset to a default state. The reset tool 268 may thus be called for by an administrator who is trying to determine an optimal configuration for the device 202 and unintentionally causes a device to become unusable. Alternatively, the reset tool 268 may be called for by an end user who chooses to reset a device to a default state.

Embodiments such as those describe herein provide several advantages to devices with a BIOS. For example, all settings of a device including BIOS settings can be "tied" to an OS image. The OS image can be captured in various ways with various existing management tools with assurance that all settings of the device have been captured in a single file. For some devices (e.g., devices with Windows CE and Linux), a global reset causes an OS bootloader to reset both OS settings and BIOS settings. BIOS settings can be managed with a BIOS setup user interface and/or an OS control panel. BIOS settings can be categorized along with OS settings to provide a uniform interface for viewing and updating all settings of the device via the OS control panel. As an example, an administrator can access a category of the OS control panel to view and update security options for all external ports of a device even though some ports involve BIOS settings and others involve OS settings.

Figure 3:
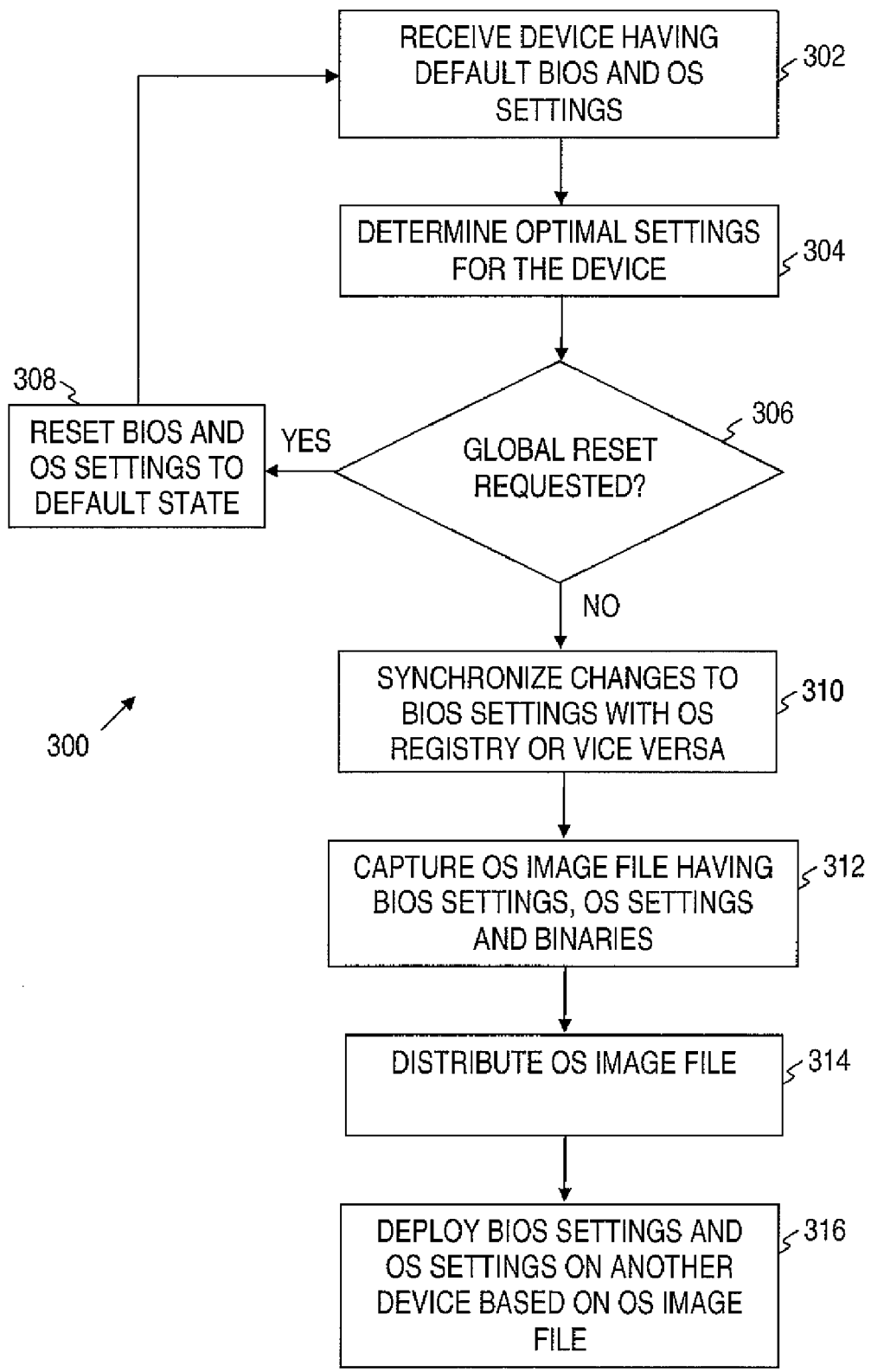
FIG. 3 illustrates a method in accordance with embodiments.

FIG. 3 illustrates a method 300, in accordance with embodiments, that comprises receiving a device having default BIOS and OS settings (block 302). At block 304, optimal settings for the device are determined. If a global reset is requested (determination block 306), the BIOS and OS settings are reset to a default state (block 308) and the method 300 returns to block 302. If a global reset is not requested (determination block 306), changes to the BIOS settings are synchronized with an OS registry or vice versa (block 310). At block 312, an OS image file having BIOS settings, OS settings and binaries is captured. The OS image file is then distributed (block 314). At block 316, the BIOS settings and OS settings are deployed on another device based on the OS image file.

Figure 4:
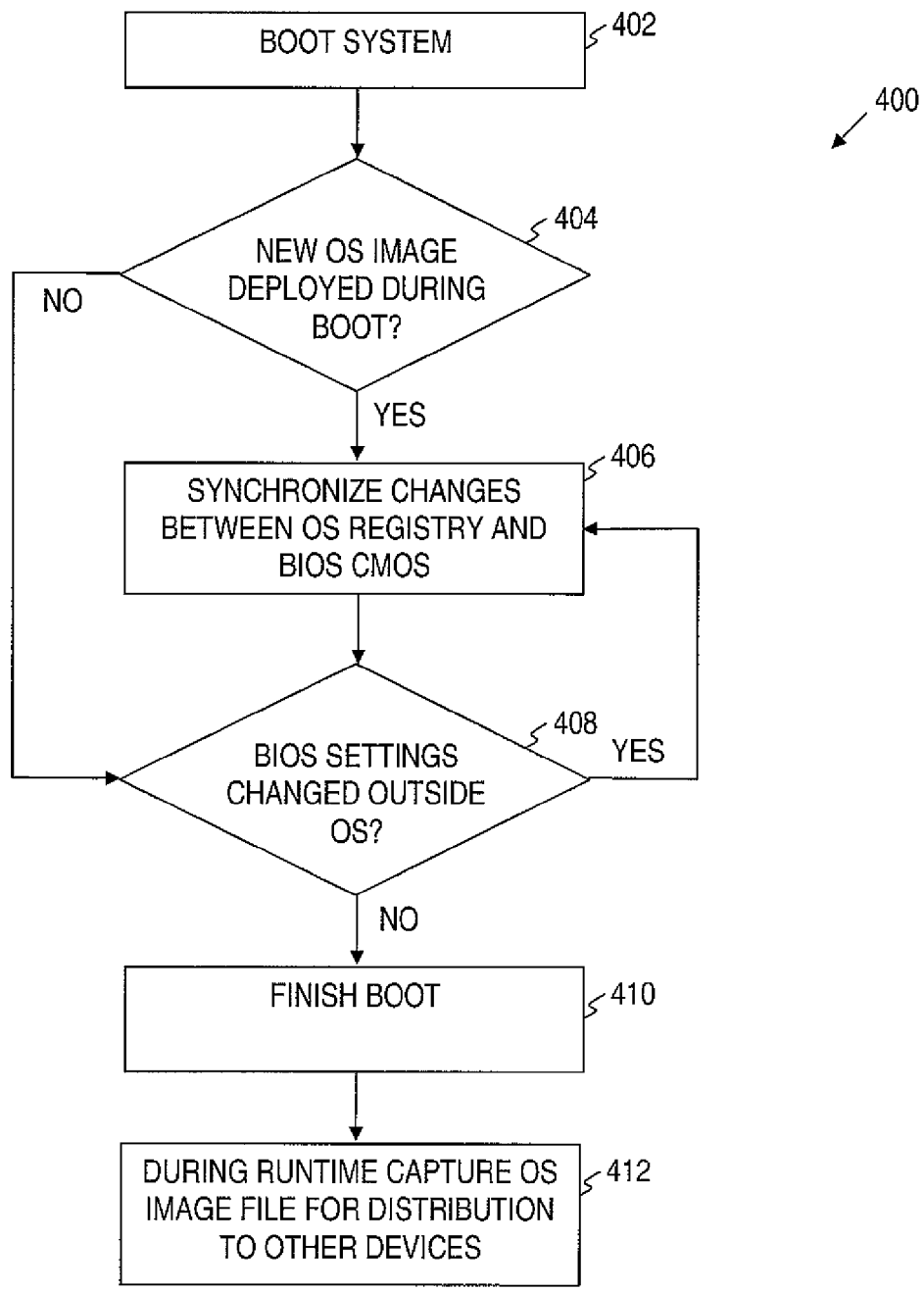
FIG. 4 illustrates another method in accordance with embodiments.

FIG. 4 illustrates another method 400, in accordance with embodiments, that comprises booting a system (block 402). If a new OS image is deployed during the boot (determination block 404), changes between an OS registry and a BIOS CMOS are synchronized (block 406). If a new OS image is not deployed during the boot (determination block 404) or after the synchronization of block 406, a determination is made regarding whether BIOS settings are changed outside (i.e., without involvement of) the OS (determination block 408). For example, the BIOS settings could be changed from DOS or from an F10 function without involvement of the OS. If BIOS settings are changed outside the OS (determination block 408), the method 400 returns to block 406. If BIOS settings are not changed outside the OS (determination block 408), the system finishes the boot process (block 410). During runtime, the OS image file is captured for distribution to other devices (block 412).

Figure 5:
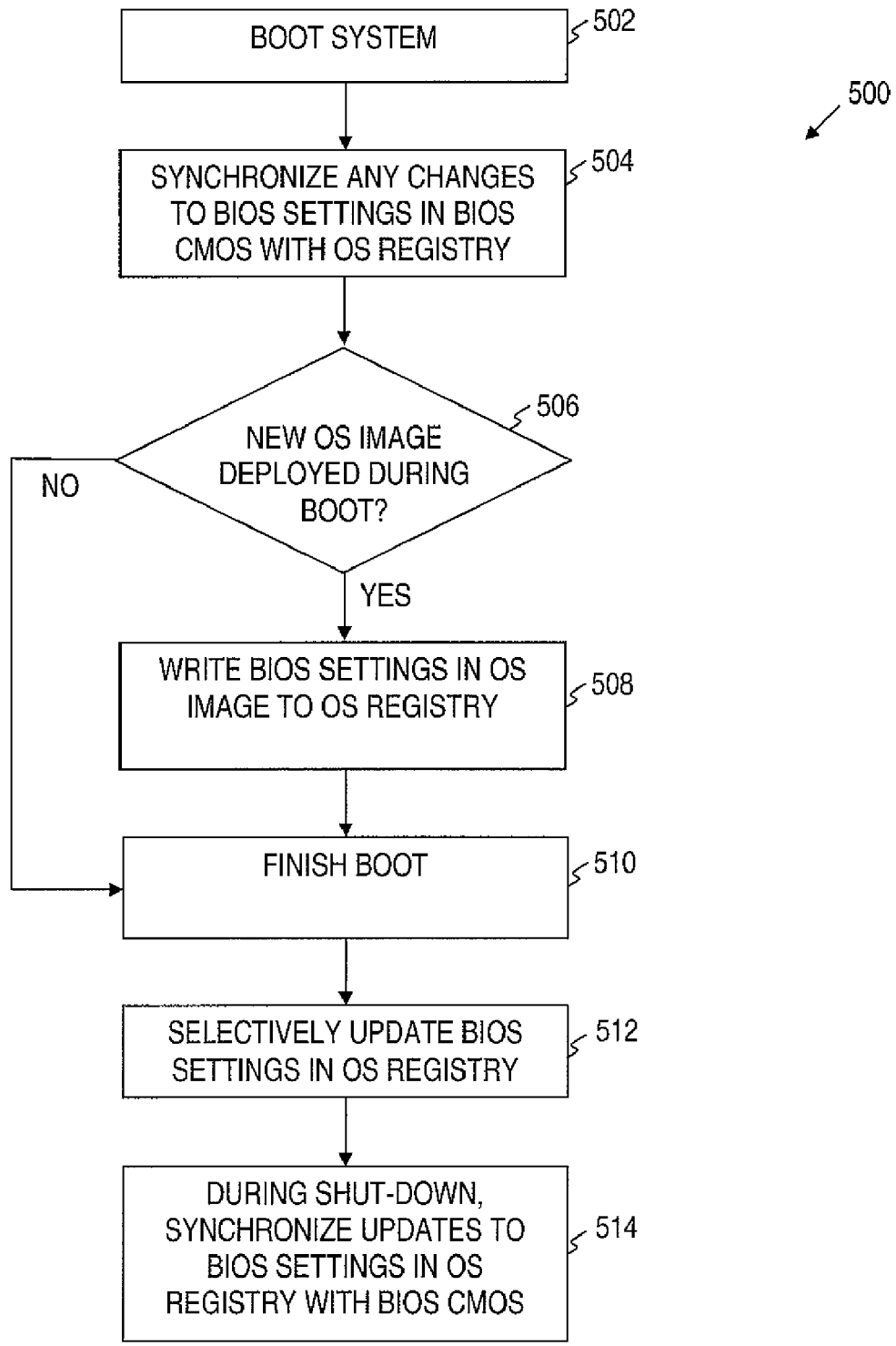
FIG. 5 illustrates yet another method in accordance with embodiments.

FIG. 5 illustrates another method 500, in accordance with embodiments, that comprises booting a system (block 502). At block 504, any changes to BIOS settings in a BIOS CMOS (or other BIOS storage) are synchronized with an OS registry. If a new OS image is not deployed during the boot (determination block 506), the boot process finishes (block 510). If a new OS image is deployed during the boot (determination block 506), BIOS settings of the new OS image are written to the OS registry (block 508) and the boot process finishes (block 510). At block 512, updates to the BIOS settings in the OS registry are selectively made. As an example, a user may access the OS control panel during runtime and update BIOS settings in the OS registry. During a shutdown process, changes to BIOS settings in the OS registry are synchronized with the BIOS CMOS or other BIOS storage (block 514).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
   a base computer having operating system (OS) settings and Basic Input/Output System (BIOS) settings stored together in an OS registry;
   a plurality of managed computers,
   wherein an OS image file having the OS settings and the BIOS settings is captured from the OS registry and transferred from the base computer to the managed computers for configuring the managed computers; and
   a configuration manager comprises a synchronize tool that, when executed, synchronizes differences between BIOS settings stored by the BIOS and the OS registry.

2. The system of claim 1 wherein the OS image file comprises OS binaries and application binaries.

3. The system of claim 1 wherein the OS image file is transferred to the managed computers via a network connection.

4. The system of claim 1 wherein the OS image file is transferred to the managed computer via a removable storage device.

5. A device, comprising:
   a processor;
   a Basic Input/Output System (BIOS) in communication with the processor;
   a storage coupled to the processor, the storage storing a configuration manager and an operating system (OS) with an OS registry that stores both OS settings and BIOS settings,
   wherein the configuration manager comprises a capture tool that, when executed, captures an OS image file from the OS registry, the OS image having said OS settings and BIOS settings, and a synchronize tool that, when executed, synchronizes differences between BIOS settings stored by the BIOS and the OS registry.

6. The device of claim 5 wherein the OS comprises a control panel interface that enables a user to update the OS settings and the BIOS settings.

7. The device of claim 5 further comprising a network interface coupled to the processor, wherein the OS image file is distributed to configure another device via the network interface.

8. The device of claim 5 further comprising a removable storage interface coupled to the processor, wherein the OS image file is transmitted to a removable storage medium via the removable storage interface for distribution to another device.

9. The device of claim 5 wherein the BIOS settings are updated using the control panel interface prior to executing the capture tool.

10. The device of claim 9 wherein the control panel interface categorizes OS settings and BIOS settings together for viewing and updating by a user.

11. The device of claim 5 wherein the configuration manager further comprises a reset tool that, when executed, resets both OS settings and BIOS settings to a default state.

12. The device of claim 5 wherein the configuration manager further comprises a deploy tool that, when executed, deploys the OS image file on another device for configuring the other computer system with the OS settings and the BIOS settings.

13. A method, comprising:
   storing, by a processor, operating system (OS) settings and Basic Input/Output System (BIOS) settings for a device together in an OS registry;
   capturing, by the processor, an OS image file from the OS registry, the OS image file having the OS settings and the BIOS settings; and
   synchronizing differences between BIOS settings stored by the BIOS and the OS registry with a synchronize tool of a configuration manager.

14. The method of claim 13 further comprising resetting the OS settings and the BIOS settings to a default state prior to said capturing.

15. The method of claim 13 further comprising grouping OS settings and BIOS settings together in categories of an OS control panel interface, wherein changes to BIOS settings via the OS control panel interface are recorded in the OS registry.

* * * * *